United States Patent

Biberman

[11] Patent Number: 5,846,033
[45] Date of Patent: Dec. 8, 1998

[54] REVERSIBLE THREAD CUTTING TOOL HOLDERS

[76] Inventor: Lev Biberman, 21 Woodridge, Buffalo Grove, Ill. 60089

[21] Appl. No.: 723,345

[22] Filed: Sep. 30, 1996

[51] Int. Cl.$^6$ .................................................. B23B 27/16
[52] U.S. Cl. .......................... 407/107; 407/111; 407/109
[58] Field of Search ..................... 407/107, 111, 407/101, 102, 106, 109, 116; 82/158, 159, 160, 161

[56] References Cited

U.S. PATENT DOCUMENTS

| | | | |
|---|---|---|---|
| 2,275,327 | 3/1942 | Sheridan et al. | 29/97 |
| 3,548,475 | 12/1970 | Fiori | 29/96 |
| 3,754,309 | 8/1973 | Jones et al. | 29/96 |
| 3,758,927 | 9/1973 | Stein | 407/101 |
| 3,846,882 | 11/1974 | Stein | 407/101 X |
| 3,939,540 | 2/1976 | Novak | 29/96 |
| 4,051,584 | 10/1977 | Huser | 407/107 |
| 4,247,231 | 1/1981 | Kraemer | 407/101 |
| 4,545,705 | 10/1985 | Benson | 407/108 |
| 4,669,924 | 6/1987 | Benson | 407/113 |
| 5,079,979 | 1/1992 | Pano | 407/110 X |
| 5,112,163 | 5/1992 | Veilleux | 407/101 |

*Primary Examiner*—Andrea L. Pitts
*Assistant Examiner*—Henry W. H. Tsai
*Attorney, Agent, or Firm*—Myers & Associates, Ltd.

[57] ABSTRACT

Reversible thread cutting tool holders having a holder body, a plate and a clamp for securing and orienting a cutting insert on opposite sides of the holder body. In one embodiment, the plate is a flat member being reversibly orientated on a top surface of the holder body and having a cut-out portion to receive part of the cutting tool. The clamp is attached to either side of the holder body and cooperates with the cut-out portion to secure the cutting insert. In a second embodiment, the holder body includes a cut-out portion to receive the cutting insert and the plate is an angle plate. The angle plate and clamp are selectively positioned on opposite surfaces of the holder body adjacent the cut-out portion to orient the cutting insert for opposite thread cuts.

14 Claims, 3 Drawing Sheets

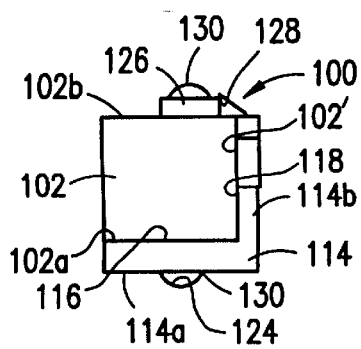
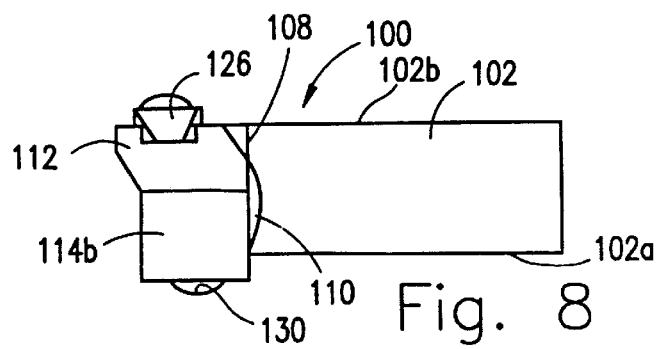
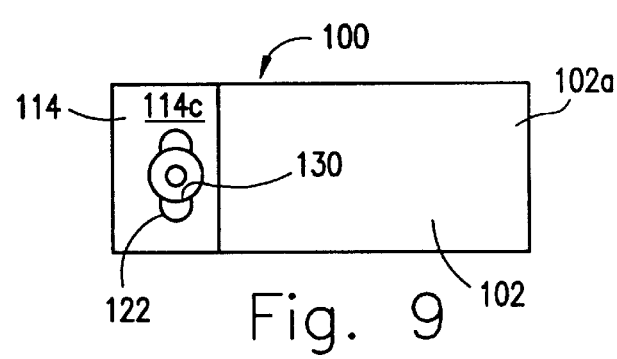
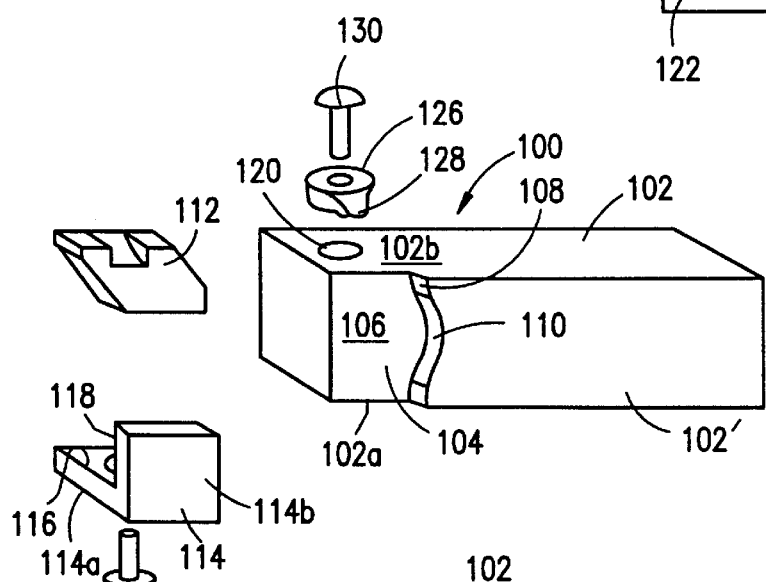
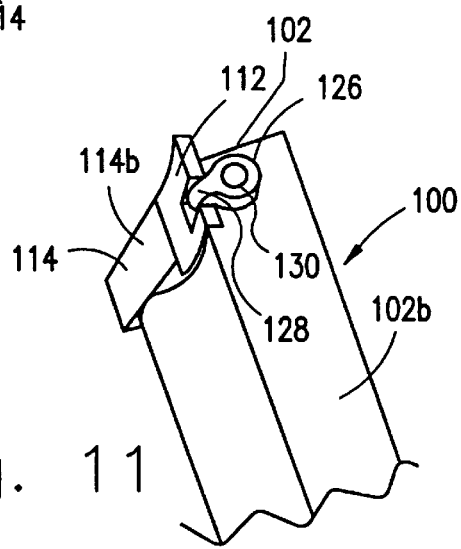
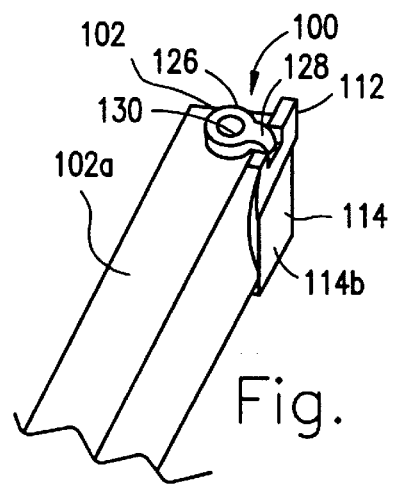

REVERSIBLE THREAD CUTTING TOOL HOLDERS

BACKGROUND OF THE INVENTION

1. Field of the Invention

This invention relates in general to thread cutting tools and more particularly to reversible thread cutting tool holders.

2. Summary of the Prior Art

Threads and grooves are commonly cut in cylindrical stock on lathes and the like. The actual cutting tools have many designs and often are formed from a hard carbide steel in the form of an insert. The insert is maintained on the machine by a tool holder. In thread operations, the direction of the cutting may need to be reversed to make either right or left threads. Prior tool holder designs are deficient in being capable of holding a cutting insert for a reverse cut. It is necessary, therefore, to use two different tool holders to cut left and right threads. Such duplication of parts is uneconomical and inefficient. Accordingly, it is desirable it to provide improved thread cutting holders capable of being reversibly orientated for both right and left thread cutting.

SUMMARY OF THE INVENTION

It is therefore an objective of the invention to provide improved reversible thread cutting tool holders. The tool holders herein disclosed effectively secure a cutting insert during use. The tool holders of the invention are capable of holding a cutting insert in reversed orientations to create left and right threads. Such reversibility eliminates the need for two different holders to make opposite thread cuts. The holders of the invention may be used with a wide range of insert designs. The holders can be reversed for opposite threads with a minimum of effort and time.

BRIEF DESCRIPTION OF THE DRAWINGS

FIG. 7 is a top perspective view, with parts exploded, of a second embodiment of the tool holder of the invention;

FIG. 8 is a top elevation view of the tool holder of FIG. 7;

FIG. 9 is a side plan view of the tool holder of FIG. 7;

FIG. 10 is an end elevation view of the tool holder of FIG. 7;

FIG. 11 is a partial perspective side of the tool holder of FIG. 7 orientated for right thread cuts; and FIG. 12 is a partial side perspective view showing the tool holder orientated for left thread cuts.

DESCRIPTION OF THE PREFERRED EMBODIMENTS

Figure 1:
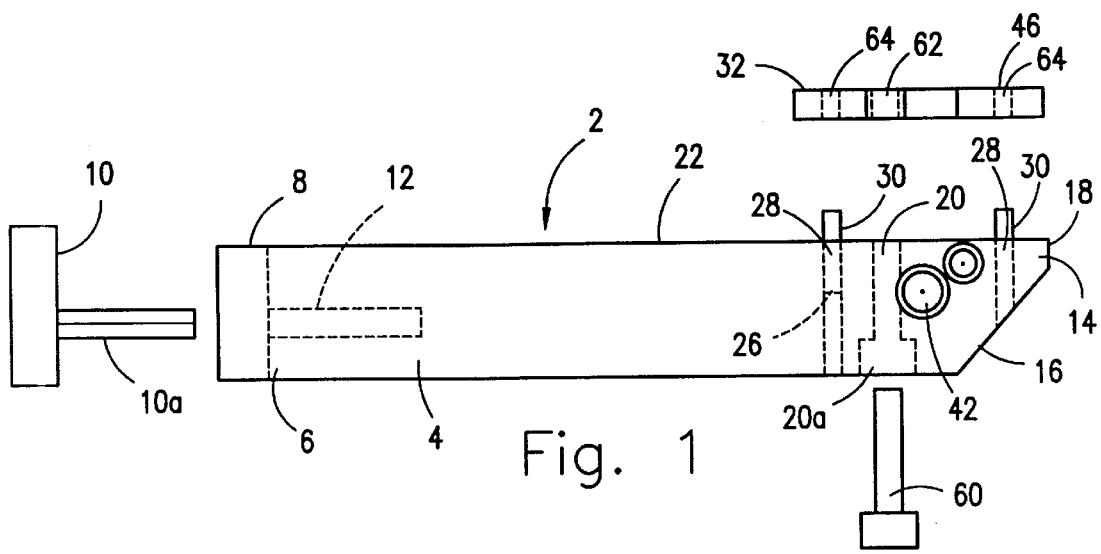
FIG. 1 is a side elevation view, with parts exploded, of a first embodiment of the reversible thread cutting tool holder of the invention.

Referring now to FIGS. 1 to 6, there is illustrated a first embodiment of the reversible thread cutting tool holder of the invention; generally designated by reference number 2. The tool holder 2 is intended to be mounted at a work station of a lathe (not shown) at a position to cut threads in rotating stock. The tool holder 2 includes a holder body 4 formed from a metal bar and having a square or rectangular cross-sectional configuration. The rear end 6 of holder body 4 includes a vertical groove 8 into which a hex wrench 10 having stem 10a may be inserted into a hexagon hole 12 provided in holder body 4. The forward work end 14 of the holder body 4 has a sloped lower surface 16 and a upper flat vertical section 18.

Figure 2:
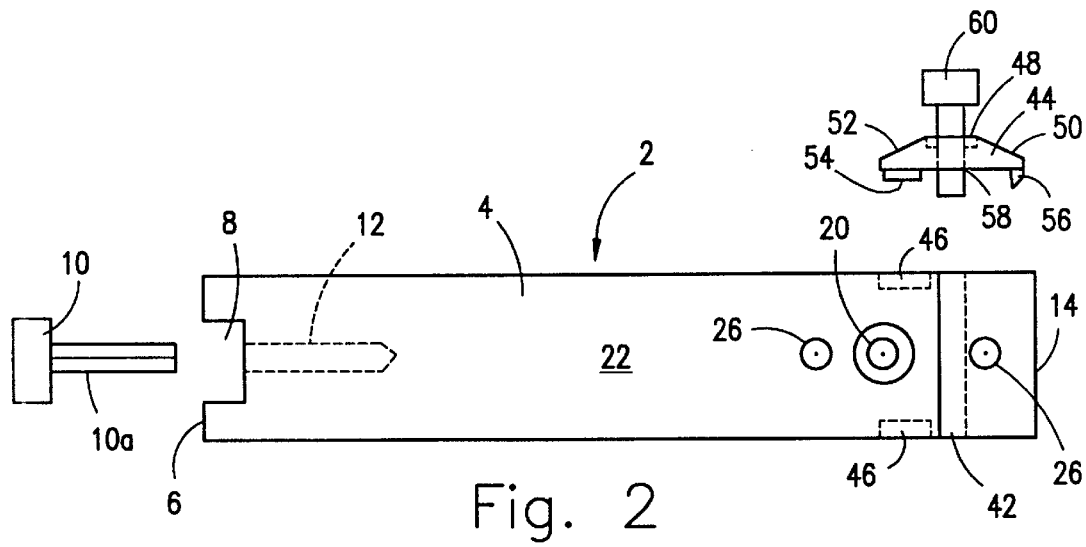
FIG. 2 is a bottom plan view, with parts exploded, of the tool holder of FIG. 1.

As seen in FIGS. 1 and 2, a threaded hole 20 extends through the holder body 4 from an enlarged lower portion 20a upward through top surface 22 of holder body 4. A threaded bolt 24 is disposed through hole 20 and is intended to protrude beyond top surface 22. A pair of holes 26 are disposed on opposite sides of threaded hole 20 in aligned relation along the longitudinal axis of holder body 4. A dowel pin 28 is force fitted in each hole 26 and provide projecting retention portions 30.

Figure 5:
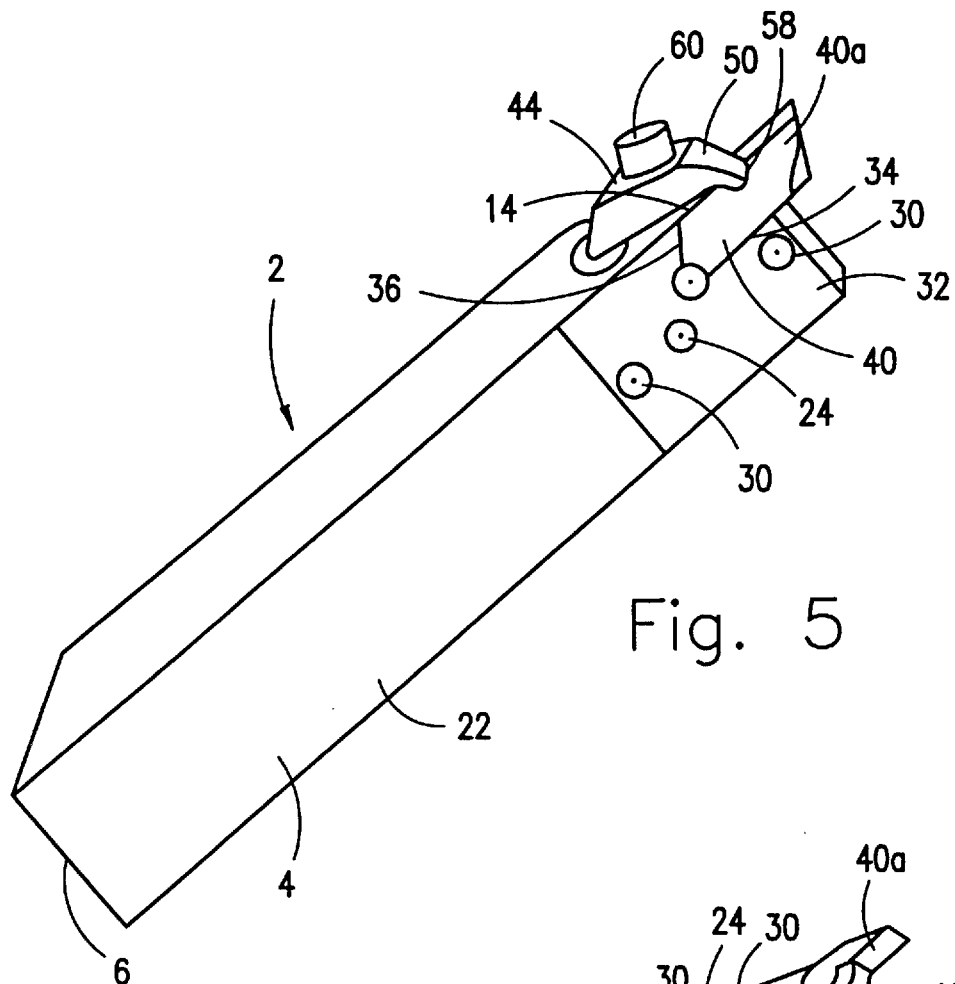
FIG. 5 is a side perspective view, with parts removed, of the tool holder of FIG. 1 orientated for right thread cuts.
Figure 6:
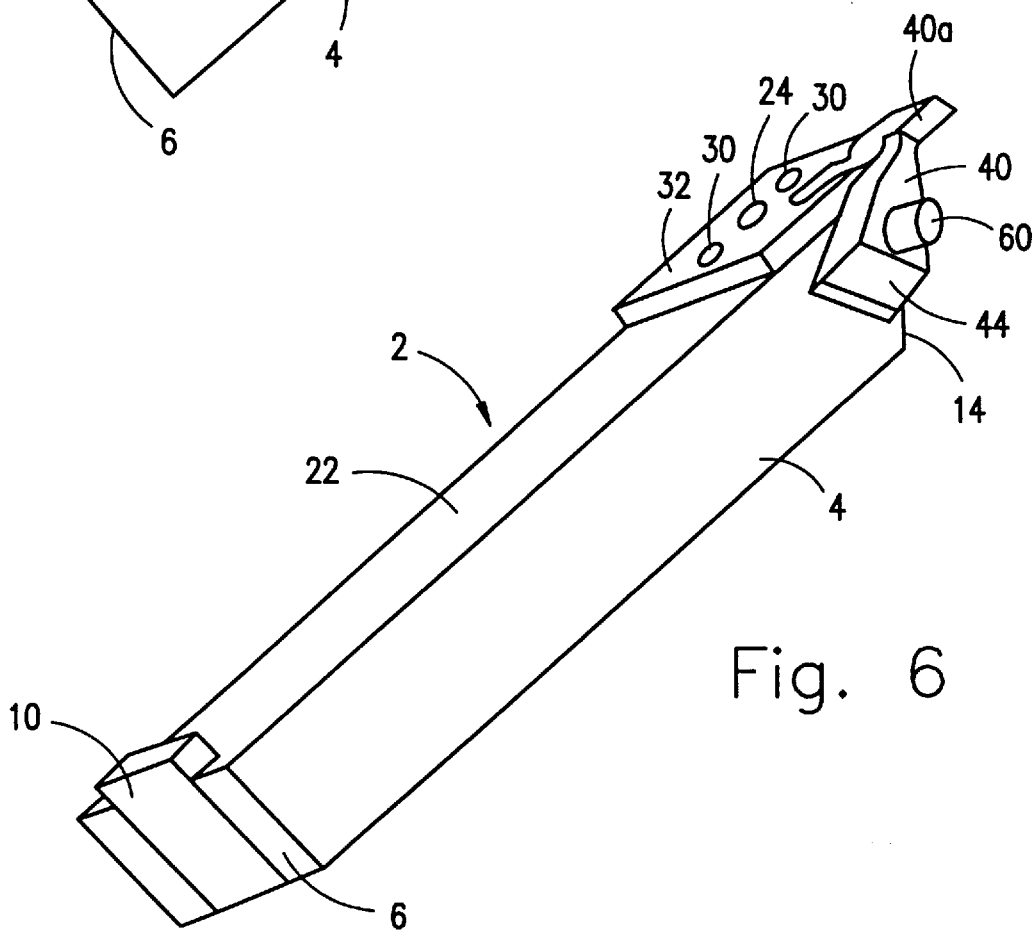
FIG. 6 is a side perspective, with parts removed, of the tool holder of FIG. 1 orientated for left thread cuts.

As seen in FIGS. 1, 3, 5 and 6, a flat insert plate 32 is retained on the top surface 22. The plate 32 includes a cut corner portion 34 having a slanted surface 36 and a flat longitudinal surface 38 corresponding to the shape of cutting insert 40 as shown in FIGS. 5 and 6. The surfaces 36 and 38 intersect with a circular cutout 39. The surfaces 36 and 38 engage the cutting tool or insert 40. The plate 32 may be reversed to orient the cut-out corner portion 34 adjacent opposite sides of the holder body 4 to secure the cutting tool 40 to make reversible thread cuts as desired.

Figure 4:
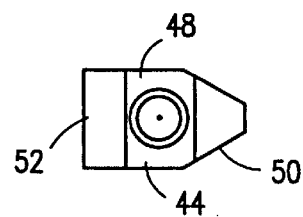
FIG. 4 is a top plan view of the clamp of the tool holder of FIG. 1.

The cutting insert or tool 40 is generally made from a carbide steel and engages the rotating stock (not shown) for cutting threads as is well known. The holder body 4 further includes a lateral threaded hole 42 (FIGS. 1 and 2) to secure the clamp 44 as illustrated in FIGS. 1, 2, 4, 5 and 6. A pair of partial retention holes 46 are drilled on opposite sides of holder body 4 angularly above threaded hole 42. The clamp 44 includes an upper flat surface 48 and upper sloped front and back surfaces 50, 52. The front surface 50 possesses a tapered shape in plan view as illustrated in FIG. 4. The bottom of clamp 44 is generally flat and includes a cylindrical projection 54 corresponding to the shape of holes 46. The front of clamp 44 includes an insert projection 56 to engage a cutting insert or tool 40 which is clamped to holder body 4. The clamp 44 has a hole 58 extending from top to bottom and receives a threaded bolt 60. The threaded bolt 60 is arranged to engage hole 42 on either side of body 4 dependent on whether a left or right thread is being cut.

Figure 3:
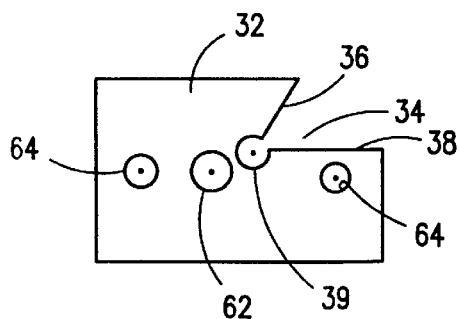
FIG. 3 is a top plan view of the insert plate of the tool holder of FIG. 1.

In use of tool holder 2, the plate 32 is retained on holder body 4 by bolt 24 being attached to hole 62 in insert plate 32 (FIG. 3). The dowel pin 28 further engages holes 64 in insert plate 32 to maintain proper alignment. The threaded bolt 60 is attached on either side of holder body 4 laterally threaded into hole 42 to secure clamp 44. The cylindrical projection 54 of clamp 44 fits into retention holes 46 to angularly orient clamp 44 (FIGS. 5 and 6) while the insert projection 56 engages cutting insert or tool 40. As seen in FIGS. 5 and 6, the shape of insert 40 generally corresponds to the cut-out corner portion 36 with a cutting surface 40a extending outward. Left or right threads are cut from attachment of the clamp 44 to opposite sides of the holder body 4 with the cutting insert 40 being appropriately oriented. In reversing the thread cut, the cut-out corner portion 36 of plate 32 is oriented adjacent the side of the holder body 4 on which the clamp 44 is attached.

Referring to FIGS. 7 to 12, the second embodiment of the invention is generally designated by reference numeral 100.

The holder body 102 is generally in the form of a rectangular bar having a cut-out portion 104 at one end of top surface 102' (FIG. 7). The cut-out portion 104 includes a flat longitudinal surface 106 and a base surface 108 having a curved intermediate section 110. The base shape of the cut-out portion generally conforms to abutting shape of a cutting tool or insert 112 (FIGS. 11 and 12). An angle support plate 114 forms right angle surfaces 116, 118 to correspond to adjacent side surfaces 102a of the holder body 102. The portion 114a is generally the same dimension as holder 102, while portion 114b is less than the corresponding dimension of holder body 102 to engage insert 112 and arrange it at the proper position for cutting. The holder body 102 further includes a threaded hole 120 opening on each side, one opening being shown in FIG. 7. The angle support plate 114 includes an elongated hole 122 to receive a threaded screw 124.

The screw 130 retains a clamp 126 on surface 102b whereby the clamp 126 has a projecting portion 128 which engages cutting insert 112 on the side of cutting tool 112. As seen in FIG. 10, the angle plate 114 is attached to holder body 102 by screw 124 extending through side surface 102a. By attaching the clamp 126 and the angle member 114, the cutting tool 112 is retained in conjunction with surfaces 106, 108 of the cut-out portion 104. By attaching the angle plate 114 to side surface 102b and clamp 126 to side surface 102a on the holder body 102 adjacent cut-out portion 104, the insert 112 may be oriented for an opposite thread cut than the arrangement that is shown in FIG. 10. The projecting portion 128 and portion 114b thus extend in opposite directions for reverse cuts than as seen in FIG. 10. In reversing the position of clamp 126 and angle plate 114 for a reverse thread cut, portion 114a of the angle plate 114 extends along surface 102b of holder body 102 with portion 114b extending downward adjacent cut-out corner portion 104. Clamp 126 is oriented on side surface 102a with projecting portion 128 also being adjacent cut corner portion 104.

What is claimed is:

1. A reversible thread cutting tool holder for holding a cutting tool comprising holder body means arranged to be attached to a thread cutting machine and having a rectangular cross sectional configuration forming two parallel pairs of intersecting walls to form a top wall, bottom wall and a pair of side walls, plate means being retained on one of said intersecting walls, said plate means having surface means for contacting the cutting tool, clamp means being selectively attached to a second wall of said intersecting walls for securing the cutting tool on said holder body means, and said clamp means being selectively attached on said second wall of said intersecting walls to secure said cutting tool for making right thread cuts, said clamp means being selectively attached to an opposite wall of said intersecting walls being parallel to said second wall for making left thread cuts.

2. The reversible thread cutting tool holder according to claim 1 wherein said plate means is attached to said top wall, said surface means of said plate means being a pair of intersecting surfaces formed to engage a portion of the cutting tool, said plate means being reversible to orient said intersecting surfaces on said top wall adjacent said opposite wall on which said clamp means is attached.

3. The reversible thread cutting tool holder according to claim 1 wherein said plate means is a flat plate, said flat plate having a cut-out portion forming said pair of intersecting surfaces.

4. The reversible thread cutting tool holder according to claim 3 wherein said flat plate is attached to said top surface.

5. The reversible thread cutting tool holder according to claim 1 wherein said second wall is a first side wall, said opposite wall is a second side wall, said clamp means includes a clamp body having a surface to contact said first side wall for making right thread cuts, said surface alternatively arranged to contact said second side wall for making left thread cuts.

6. The reversible thread cutting tool holder according to claim 5 wherein said clamp body includes a projection for clamping the cutting tool to said body means.

7. The reversible thread cutting tool holder according to claim 6 wherein said clamp means further includes retention means for attaching said clamp body in an orientation on said holder body means to contact the cutter tool.

8. The reversible thread cutting tool holder according to claim 1 wherein said holder body means includes a plurality of attachment elements projecting beyond said one of said intersecting walls for retaining said plate means.

9. The reversible thread cutting tool holder according to claim 8 wherein said holder body means includes a threaded hole extending between said pair of side walls, bolt means for selectively attaching said clamp means to said threaded hole on said pair of side walls.

10. The reversible thread cutting tool holder according to claim 1 wherein said holder body means includes a cut-out portion to form wall means for receiving the cutting tool, said cut-out portion being formed in said top wall.

11. The reversible thread cutting tool holder according to claim 10 wherein said plate means includes an angle plate having first and second right flat portions, said first right angle plate portion contacting said top wall adjacent said cutting tool being received in said cut-out portion.

12. The reversible thread cutting tool holder according to claim 11 wherein said angle plate includes the second portion being selectively attached to one of said pair of side walls for making a right hand cut, said second portion being selectively attached to the other of said pair of side walls when said clamp means is attached to said opposite wall.

13. The reversible thread cutting tool holder according to claim 1 wherein said clamp means is selectively attachable to said second wall and said opposite wall, said plate means being further selectively attachable to said second wall and said opposite wall in opposite orientation to said clamp means for respectively making said right thread cut and for making said left thread cut.

14. The reversible thread cutting tool holder according to claim 11 wherein said cut-out portion includes wall means having a configuration generally corresponding to the portion of cutting tool in contact with said wall means.

\* \* \* \* \*